(12) United States Patent
Shain

(10) Patent No.: US 7,801,323 B2
(45) Date of Patent: Sep. 21, 2010

(54) SOUND MODIFYING CAP FOR HOUSING

(75) Inventor: Thomas A. Shain, Westerville, OH (US)

(73) Assignee: Floyd Bell, Inc., Columbus, OH (US)

( * ) Notice: Subject to any disclaimer, the term of this patent is extended or adjusted under 35 U.S.C. 154(b) by 1641 days.

(21) Appl. No.: 11/042,294

(22) Filed: Jan. 25, 2005

(65) Prior Publication Data

US 2005/0147271 A1  Jul. 7, 2005

Related U.S. Application Data

(63) Continuation-in-part of application No. 10/651,280, filed on Aug. 28, 2003, now Pat. No. 7,090,454, which is a continuation-in-part of application No. 29/186,958, filed on Jul. 24, 2003, now Pat. No. Des. 521,403.

(51) Int. Cl.
*H04R 1/02* (2006.01)

(52) U.S. Cl. .................. 381/386; 381/387; 381/354

(58) Field of Classification Search .......... 181/185, 181/186, 197, 277, 287, 346, 347, 198; 381/152, 381/334, 386–389, 391, 395, 345–347, 354
See application file for complete search history.

(56) References Cited

U.S. PATENT DOCUMENTS

| | | |
|---|---|---|
| 763,210 A | 6/1904 | Schwamberger et al. |
| 2,730,154 A | 1/1956 | Aspey |
| 4,293,984 A | 10/1981 | Kaufmann, Jr. |
| 4,705,442 A | 11/1987 | Fucci |
| 4,990,044 A | 2/1991 | Kimak |
| 5,178,504 A | 1/1993 | Falchi |
| 5,304,022 A | 4/1994 | Huska |
| 5,713,708 A | 2/1998 | Van derDrift et al. |
| 5,729,605 A * | 3/1998 | Bobisuthi et al. ........... 379/430 |
| 5,797,572 A | 8/1998 | Schmucki et al. |
| 5,980,177 A | 11/1999 | Schiess et al. |

* cited by examiner

*Primary Examiner*—Curtis Kuntz
*Assistant Examiner*—Ryan Robinson
(74) *Attorney, Agent, or Firm*—Jason H. Foster; Kremblas & Foster

(57) ABSTRACT

A device for housing a sound-emitting transducer including a housing and a cap. The housing has a chamber defined by a cylindrical sidewall and an endwall with apertures. The cap mounts to the housing, and has apertures that can register with the apertures in the endwall. A groove is formed between the cap and teeth formed at its circular outer periphery. The cap's circular lip is inserted into the groove by deforming the cap slightly. Thus, relative movement is permitted between the cap and housing for registering and de-registering the apertures on the cap and housing. This controls the volume of the sound-emitting transducer.

9 Claims, 13 Drawing Sheets

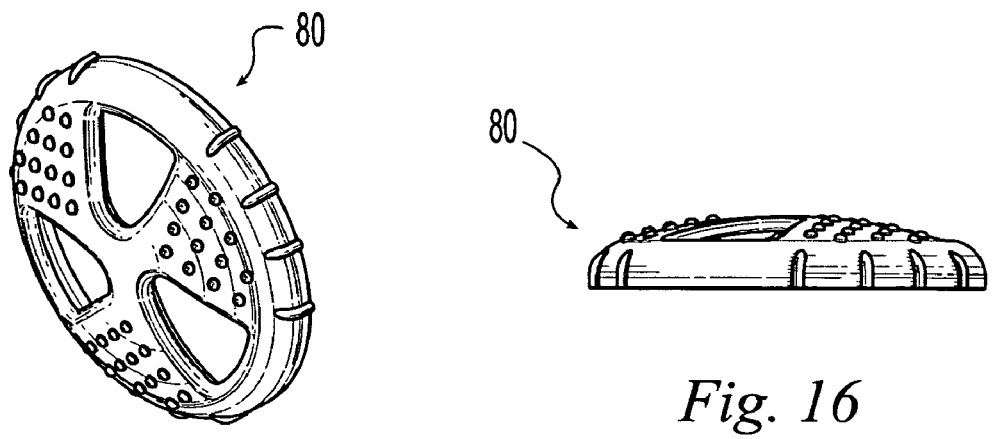
Fig. 15
Fig. 16
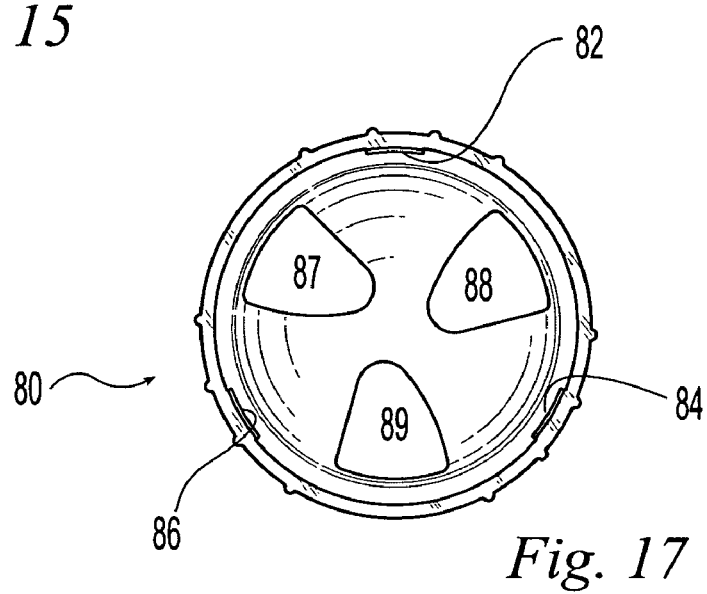
Fig. 17
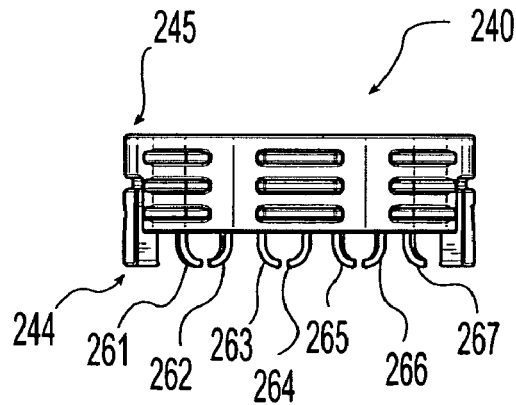
Fig. 18

US 7,801,323 B2

SOUND MODIFYING CAP FOR HOUSING

CROSS-REFERENCES TO RELATED APPLICATIONS

This application is a Continuation-in-Part of U.S. Nonprovisional application Ser. No. 10/651,280 filed Aug. 28, 2003, now U.S. Pat. No. 7,090,454 which is a Continuation-in-Part of U.S. Design patent application No. 29/186,958 filed Jul. 24, 2003, now U.S. Design No. 521,403.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to an apparatus for mounting through an aperture in a panel where the apparatus is configured to contain an object, such as a sound-emitting transducer. The invention relates more specifically to a cap for the apparatus, where the cap is configured to rotate to modify the volume of the sound passing through the apparatus.

2. Description of the Related Art

There are many fasteners that are capable of fastening two or more structures together. The conventional wood or metal screw has helical threads around a shaft, and the threads seat against the inwardly facing wall of an aperture formed in the structures. As the screw shaft is rotated, the screw head is displaced closer to one side of the structures to fasten them together. Alternatively, a nut and bolt can be used to fasten two or more objects together when the shaft of the bolt is inserted through an aperture in the objects and the bolt's head seats against the object on one end of the aperture and the nut seats against the object on the opposite end of the aperture. Upon tightening of the nut relative to the bolt, the interposed objects are fastened together.

One difficulty with a conventional nut and bolt is that it often takes numerous rotations of the nut relative to the bolt to tightly interpose the structure between the head and nut. Furthermore, if carried out by hand, these numerous rotations may consume time unnecessarily or cause repetitive-motion injuries, such as carpal-tunnel syndrome.

Various attempts have been made to solve these problems. U.S. Pat. No. 5,304,022 to Huska shows a bolt with a tapered shaft and a nut with engaging pitched threads on portions of the radially inwardly facing surface of the nut. Non-threaded portions of the radially inwardly facing surface of the nut are formed between the threaded portions of the nut, and a non-threaded portion of the bolt's shaft are formed between threaded portions. This configuration permits the nut to be slid onto the shaft for a part of the shaft's length.

U.S. Pat. No. 763,210 to Schwamberger and U.S. Pat. No. 5,980,177 to Schiess et al., disclose similar nut and bolt fasteners in which a nut is rapidly slid onto the bolt's shaft and then rotated to engage pitched threads. Such devices have the disadvantage that they still require some rotation. An additional disadvantage is that the pitch and coarseness of the threads must be such that the fastener can be tightened on opposite sides of the structures on which it is attached within the partial rotation permitted before the threads disengage. Otherwise, the fasteners will disengage without being sufficiently tightened.

U.S. Pat. No. 4,990,044 to Kimak is directed to a push-on fastener in which a nut has threaded structures that can be displaced radially away from a threaded shaft to permit the nut to slide over the bolt's threads. The nut is pushed as far as desired, and then threaded the remainder of the way. A disadvantage of such a device is that the tightening force on the nut also tends to displace the threaded structures radially, thereby permitting the nut to back off and loosen the fastener. Thus, any over-tightening might cause the nut to come loose over time, especially in an environment in which there is vibration.

One particular use for the above-described fasteners is as a housing for a sound-emitting transducer, such as a piezoelectric alarm or chime. Such transducers must often be mounted through an aperture formed in a panel, such as an elevator control panel, an automobile dashboard panel, or other structure. Conventional piezoelectric transducers, such as those offered and sold by Floyd Bell, Inc., have a circular cylindrical housing that contains the circuitry and a diaphragm that vibrates upon the actuation of the piezoelectric transducer. The housing has a helically-threaded male tip that extends through the aperture in the panel. A helically-threaded female collar fits onto the threading of the tip and tightens the housing against the back of the panel in the manner of a nut and bolt.

Conventional fasteners and housings have drawbacks that should be overcome to decrease the time required for installation, reduce repetitive-action injuries, improve the appearance of the finished product and decrease the likelihood of vibrating loose. Furthermore, such housings need volume-adjustment capability. Conventional housings have shutters with apertures that can be aligned with apertures in the housing. Sound waves can pass through the apertures when they are aligned, and are restricted when the apertures are not aligned.

Conventional volume-adjustment shutters have a fastener, such as a rivet or screw, that extends through the shutter and into the housing. The shutter rotates around the fastener in order to align and adjust the position of the apertures in the shutter relative to the apertures in the housing. However, such a structure has disadvantages, such as the need for an extra part (the fastener), the need for another hole in the housing for the fastener to pass through, and difficulty in removing the shutter once the fastener is in place. Finally, it is possible for fasteners such as screws to vibrate loose, thereby causing the shutter to fall off.

There is a need for a shutter and housing having a structure that overcomes these problems.

BRIEF SUMMARY OF THE INVENTION

The invention is a panel-mountable, sound-emitting apparatus. The apparatus comprises a housing body having a preferably substantially cylindrical sidewall and an endwall at a first sidewall end. The housing body has a substantially circular peripheral shoulder. A chamber is formed within the sidewall and endwall for housing a sound-emitting device, such as a piezoelectric alarm. At least one aperture is, and preferably a plurality of apertures are, formed in the endwall through which sound waves can travel from the alarm in the chamber to the exterior of the transducer.

A cap body is rotatably mounted to the endwall at the substantially circular peripheral shoulder. The cap body has a cap wall with at least one aperture that is, and preferably a plurality of apertures that are, configured to register at least partially with the apertures in the endwall of the housing. At least one tooth is, and preferably a plurality of teeth are, formed on the cap body to define a groove between the tooth and the cap wall. The substantially circular peripheral shoulder extends into this groove to form a friction-fit mounting of the cap on the housing. Thus, the cap is mounted to the housing, and can be easily removed without the need for removal of special fasteners.

BRIEF DESCRIPTION OF THE SEVERAL
VIEWS OF THE DRAWINGS

FIG. 15 is a view in perspective illustrating the preferred embodiment of the cap.

FIG. 16 is a side view illustrating the preferred embodiment of the cap.

FIG. 17 is a plan view illustrating the underside of the preferred embodiment of the cap.

FIG. 18 is a side view illustrating an alternative embodiment of the nut member.

Figure 1:
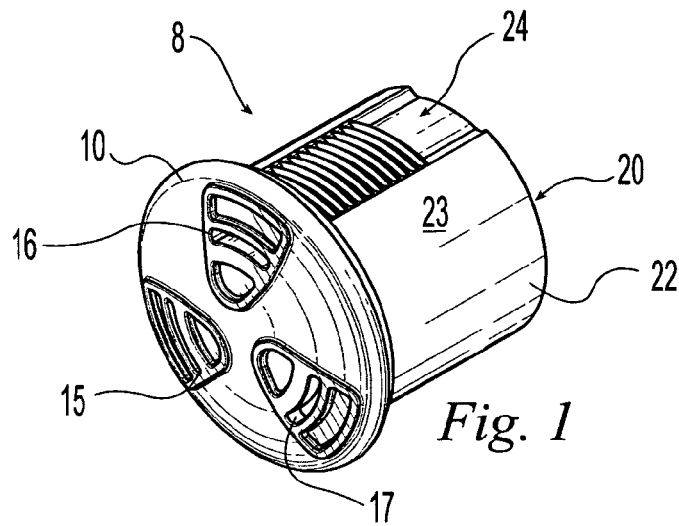
FIG. 1 is a view in perspective illustrating the shank member.
Figure 2:
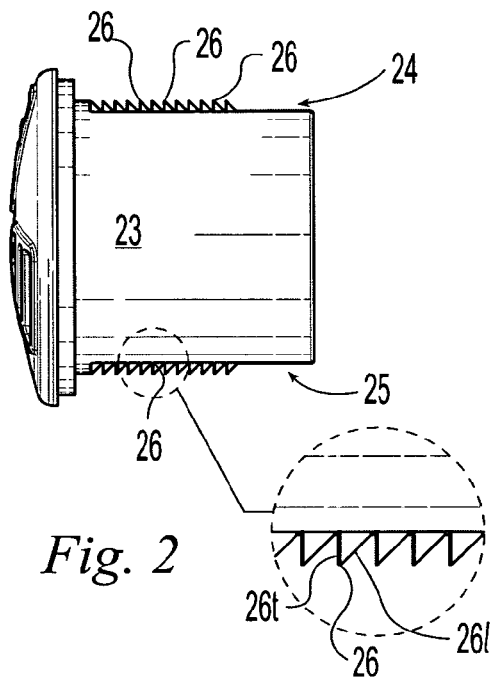
FIG. 2 is a side view illustrating the shank member.
Figure 3:
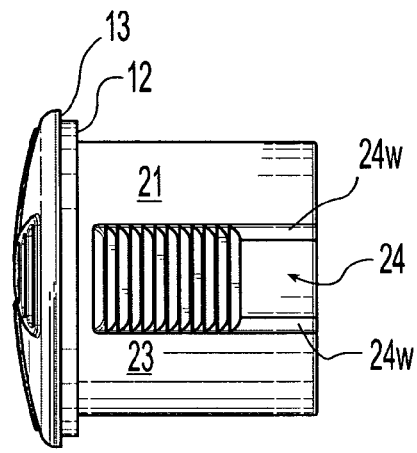
FIG. 3 is a plan view illustrating the shank member.
Figure 4:
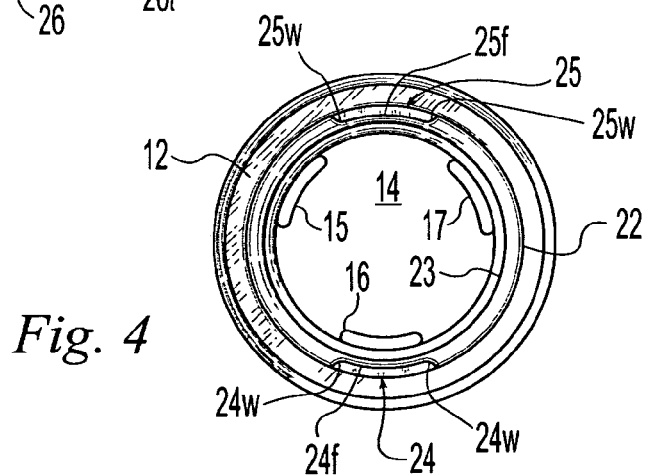
FIG. 4 is an end view illustrating the shank member.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

The preferred embodiment of the present invention has two main components: a shank member 8 and a nut member 40. In a preferred configuration, the nut member 40 is mounted to the shank member 8 after the shank member 8 is inserted through an aperture in a panel or another structure. The shank member 8 is installed through the panel aperture with the head 10 of the shank member 8 at the front of the panel and the nut member 40 at the rear. Of course, this could be reversed, for example, for switches mounted in the shank member 8. The chamber within the shank member can contain a sound-emitting device, such as a piezoelectric alarm or any other electro-acoustic transducer.

The shank member is shown in FIGS. 1 through 4 having the head 10 and a sidewall 20. The sidewall 20 is preferably a circular cylindrical body having a radially outwardly facing surface 22 and an opposing radially inwardly facing surface 23. The outwardly facing surface 22 has longitudinal channels 24 and 25 formed on substantially opposite sides of the sidewall 20, and longitudinal smooth regions 21 and 23 between the channels 24 and 25 that separate the channels 24 and 25 from each other. The term "longitudinal" is defined herein to mean substantially parallel to the axis of the sidewall 20. Thus, the channels 24 and 25 are longitudinal, as are the smooth regions 21 and 23. Additionally, the smooth regions 21 and 23 could be less than perfectly smooth, and indeed could be multifaceted or wavy. The important feature of the smooth longitudinal regions 21 and 23 is that they permit sliding movement of the nut member 40 as described below. The term "smooth" is defined as permitting substantially unrestricted longitudinal sliding of the surfaces of the nut member 40 that contact the smooth regions 21 and 23 during normal use.

A plurality of longitudinally aligned teeth 26 are formed in the elongated, longitudinal channels 24 and 25. The teeth 26 are separated by gaps between adjacent teeth 26. As shown in detail in FIG. 2, each tooth 26 has a leading wall 26l and a trailing wall 26t, both of which are transverse to the axis of the shank member 8. It is preferred that the trailing wall 26t be substantially perpendicular to the axis of the shank member 8, and the leading wall 26l be at an angle that is not perpendicular, thereby creating a saw tooth structure with oblique leading walls and perpendicular trailing walls relative to the axis of the sidewall 20.

The channels 24 and 25 have a radially outwardly facing floor 24f and 25f, respectively, the lateral boundaries of which are defined by the channel walls 24w and 25w, respectively, at opposite lateral channel sides. Each channel wall is inclined from the channel floor radially and laterally outwardly toward the substantially smooth longitudinal regions 21 and 23 of the sidewall 20 between the channels 24 and 25, thereby forming ramped surfaces extending from the channels' floors to the smooth regions 21 and 23. In a preferred embodiment the tip of each tooth 26 is at substantially the same radial distance from the sidewall's axis as the smooth regions 21 and 23, and the deepest part of each gap is at substantially the same radial distance as the floors of the channels.

It is apparent that the channels 24 and 25 are longitudinally aligned, locally thinned regions of the sidewall 20 with teeth 26 aligned therein. The inclined walls 24w and 25w extend from the floors 24f and 25f, and from the deepest parts of the gaps between the teeth 26, to the substantially smooth regions 21 and 23. Each tooth 26 has opposing ends that terminate at the walls of the respective channel in which the tooth 26 is formed. Additionally, the teeth 26 preferably are not pitched like screw threads, although this is a possible alternative to the preferred configuration.

The head 10 is rigidly mounted at one end of the shank member 8, and is preferably integrally formed with the sidewall 20. The preferred head 10 is defined by a radially outwardly extending shoulder 12 that, when the sidewall 20 is extended through an aperture in a panel or other structure, seats against one side of the panel or other structure. The head 10 could alternatively be removably mounted to the sidewall 20 at the time of manufacture, or it could be mounted to the sidewall 20 removably or permanently during the process of installing the shank member 8 and nut member 40 to a panel or other structure.

The preferred shoulder 12 extends at a ninety degree (90°) angle from the sidewall 20, although it is possible that a shoulder can extend at a smaller or larger angle. The critical structure of the head is a radially outwardly extending shoulder, at the transition between the shank member sidewall and the head, that seats against the panel or other structure through which the shank member 8 extends and prevents passage of the shank member 8 completely through the aperture. Thus, one contemplated alternative head has a shoulder extending at a 179 degree angle relative to the sidewall 20 and another alternative head has a shoulder that extends at a 1 degree angle relative to the sidewall 20. The shoulder could be at any angle in between. The shoulder of an alternative embodiment does not have to seat against one side of the panel or other structure, but can seat against the surface defining the aperture through the panel or other structure, which aperture could be conically shaped to receive a shoulder's complementary conical shape.

The head 10 also caps the sidewall 20 of the shank member 8. An internal chamber is defined by the radially inwardly facing surface 23 and the inner surface 14 of the head 10. There are small apertures 15, 16 and 17 formed in the head 10 to permit air to move from the internal chamber to the exterior of the shank member 8 through the head 10. In one contemplated embodiment, a sound-emitting transducer, such as a piezoelectric alarm, is housed in the internal chamber. Such a transducer produces sound waves in a conventional manner, and these sound waves can pass easily through the head 10 via the apertures 15, 16 and 17. Alternatively, a switch can be mounted in the chamber.

The nut member 40 is shown in FIGS. 5 through 9 having an annular, preferably circular cylindrical configuration with a radially outwardly facing surface 42, a radially inwardly facing surface 43, a first end 44 and a second end 45. The radius of the radially inwardly facing surface 43 is similar to, and preferably slightly greater than, the radius of the radially outwardly facing smooth regions 21 and 23 of the shank member 8. Thus, the nut member 40 can be aligned coaxially with the sidewall 20 of the shank member 8, and slid onto the sidewall 20 with the radially inwardly facing surface 43 adjacent to, and preferably slidably contacting, the radially outwardly facing smooth regions 21 and 23.

A first tab 46 and a second tab 48 are formed on substantially opposite sides of the nut member 40, and are part of the nut member 40. There could be only one, or more than two tabs on the nut member 40, and the two or more tabs could be other than oppositely positioned around the nut member 40. The tabs 46 and 48 extend longitudinally along the sides of the nut member 40 in the manner of cantilevers. The nut member 40 is preferably made of plastic or another material that has inherent resiliency, which causes the tabs 46 and 48 to be resilient and therefore to have free ends which can be bent radially inwardly and outwardly.

Each tab has at least one, and preferably more than one, tooth 50 formed on the radially inwardly facing surface 43. In the preferred embodiment, there are multiple longitudinally aligned teeth 50 separated by gaps, and each tooth 50 forms a pawl at the radially inwardly facing surface 43 of the tabs 46 and 48. The teeth 50 have a leading wall 50l that is transverse to the axis of the nut member 40, and a trailing wall 50t that is transverse, and preferably substantially perpendicular, to the axis of the nut member 40. Thus, the teeth 50 can lock with the teeth 26 to prevent, or at least substantially hinder, longitudinal movement of the nut member 40 relative to the shank member 8 in the direction of the trailing walls 50t and 26t abutting one another, but permit movement in the opposite longitudinal direction because the leading walls 50l can slide against the leading walls 26l. The teeth 50 can extend into the gaps between the teeth 26 of the shank member 8, and vice versa, when the teeth 26 and the teeth 50 are alternatingly aligned as described below.

A first resilient flange 60 and a second resilient flange 61 are mounted to the first end 44 of the nut member 40 to form springs. The flanges 60 and 61 are preferably integrally formed with the other parts of the nut member 40, which are made of a resilient plastic or other suitable material. The resilient flanges 60 and 61 can be flexed by the amount of force that can be applied by the average human's hands in the manner of assembling the nut member 40 on the shank member 8 as is described below. The flanges 60 and 61 form protruding springs that can engage the panel or other structure to which the shank member 8 and nut member 40 are attached. Protruding springs (of which the flanges 60 and 61 are one example) also include any members that are not resilient or are less resilient and are positioned to seat against or otherwise engage the panel or other structure. Any rigid member thus mounted to the spring is considered part of the spring for the purpose of the invention.

Figure 27:
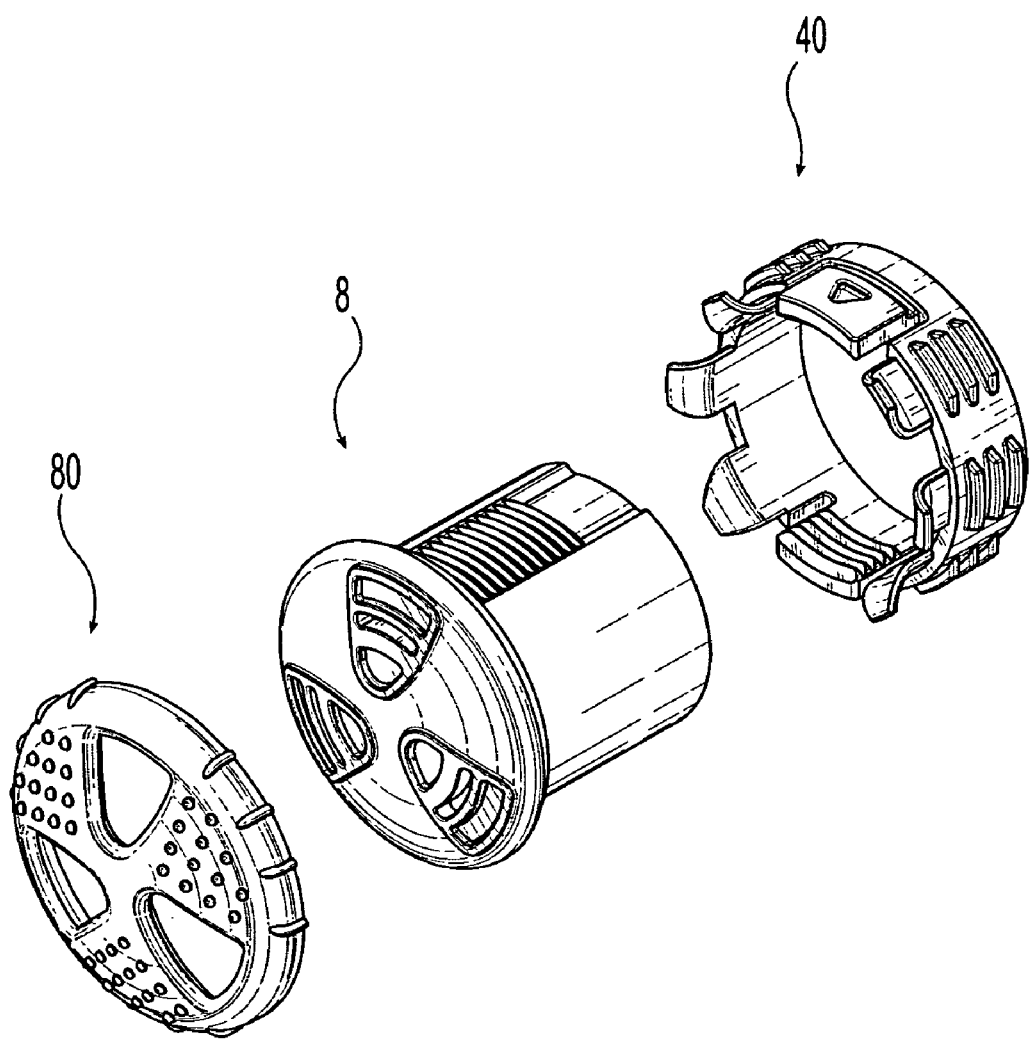
FIG. 27 is an exploded view in perspective illustrating the preferred components of the present invention aligned coaxially with one another.

An exploded view of the entire preferred embodiment is shown in FIG. 27. In order to assemble the above-described nut member 40 on the shank member 8, the sidewall 20 of the shank member 8 is extended through an aperture in a structure, such as the electrical panel 75 shown in FIG. 28 and in phantom in FIG. 10. The nut member 40 is then aligned substantially coaxially with the shank member 8, with the first end 44 of the nut member 40 closest to the end of the sidewall 20 that is farthest from the head 10 as shown in FIG. 29. The nut member 40 is then displaced longitudinally toward the shank member 8, and the tabs 46 and 48 and the teeth 50 thereon, are positioned directly radially outwardly of the channels 24 and 25 in registration with the channels.

As described above, the channels 24 and 25 have floors that are positioned radially inwardly from the smooth regions 21 and 23. Thus, the tabs 46 and 48 do not bend radially outwardly when the teeth 50 on the tabs 46 and 48 are positioned in the channels 24 and 25. However, because the tips of the teeth 50 are at a smaller radius than the radially inwardly facing surface 43 of the nut member 40, the tabs 46 and 48 have to bend radially outwardly slightly to permit the tips of the teeth 50 to rest against the smooth regions 21 and 23. Therefore, if the tabs 46 and 48 are not in registration with the channels 24 and 25, then a slight rotation of the nut member 40 relative to the shank member 8 will displace the teeth 50 into registration with the channels. The user will "feel" when registration occurs, because when the tips of the teeth 50 are positioned in the channels 24 and 25, there is less resistance to rotation than when there is not registration.

Once there is registration, the user applies longitudinal forces on the shank and nut members toward one another. These longitudinal forces cause the teeth 50 on the tabs 46 and 48 to slide along the channels until they abut the teeth 26 in the channels 24 and 25. The teeth 50 are substantially parallel to the teeth 26, and the dimensions of the teeth 50, including height, width, length, tooth side angles and tooth shape are preferably substantially the same. Another way of characterizing the teeth 26 and 50 is to refer to each grouping of aligned teeth as having substantially the same wave form and wavelength, the latter of which is defined as the distance from the peak of one tooth to the peak of the next adjacent tooth. This is analogous to wave terminology used in electronics.

After the initial abutment of the teeth 50 with the teeth 26, as the nut member 40 is displaced farther longitudinally onto the shank member 8, the teeth 50 on both tabs 46 and 48 are displaced radially outwardly. The tabs 46 and 48, which are radially flexible, can be displaced radially outwardly for permitting radial displacement of the teeth 50 away from the teeth 26. The outward displacement of the tabs is due to relative sliding of the inclined, oblique leading walls 26*l* and 50*l* acting as inclined planes that direct the longitudinal force radially outwardly to thereby displace the tabs 46 and 48 radially. This radial displacement permits the teeth 50 to ride up onto the teeth 26.

Figure 10:
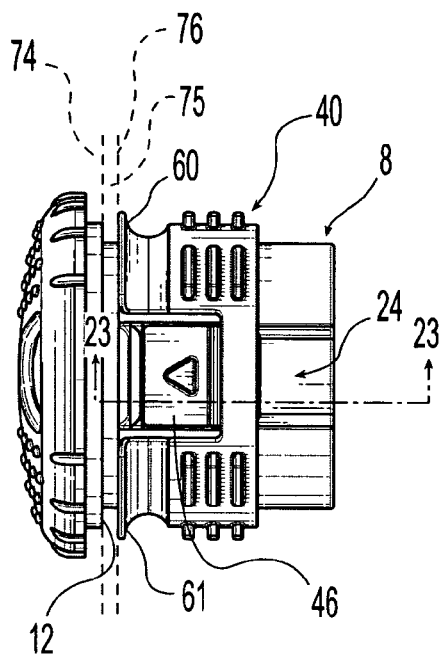
FIG. 10 is a side view illustrating the preferred embodiment of the present invention installed on a panel.

When the nut member 40 has moved longitudinally far enough onto the shank member 8 to cause the tips of the teeth 26 to slide completely up on the tips of the teeth 50, a small amount of continued longitudinal movement will cause the tips of the teeth 26 and 50 to slide past one another. When this occurs, the outwardly displaced tabs 46 and 48 will spring radially inwardly because the outwardly directed force is removed. As the tabs 46 and 48 spring radially inwardly, each of the teeth 26 will find a gap between adjacent opposing teeth 50, and vice versa, and will plunge radially to the deepest part of the gap between the respective teeth. Continued longitudinal force will cause this process of teeth 50 sliding over teeth 26 to continue until the shoulder 12 of the head 10 seats against a first side 74 of the panel 75, and the springs, preferably the flanges 60 and 61, seat against the opposite side 76 of the panel 75 as shown in FIG. 10 and FIG. 30.

At the point of initial contact between the flanges 60 and 61 and the side 76 of the panel 75, the flanges 60 and 61 are not deformed. Further displacement beyond the point of initial contact bends the flanges 60 and 61 in compression. Depending upon the relationship between the thickness of the panel wall and the wavelength of the teeth 26, at the point of initial contact the trailing wall 26*t* of the teeth 26 may not be seated against the trailing wall 50*t* of the teeth 50, which is the position at which the teeth 26 and 50 lock the nut member 40 to the shank member 8 and prevent longitudinal relative backward movement of the nut member 40 off of the shank member 8. For example, if at initial contact between the flanges 60 and 61 with the side 76 of the panel 75, the tips of the teeth 50 and 26 are in contact, release of the longitudinal force on the nut member 40 would result in a backward movement of the nut member 40 due to the tabs 46 and 48 applying a radially inwardly directed bias against the inclined leading walls 26*l* and 50*l*. In order to prevent this loose fit, after the initial contact, the nut member 40 is displaced farther longitudinally to bend the flanges 60 and 61, until the teeth 50 on the nut member 40 lock into the teeth 26 on the shank member 8 with the flanges 60 and 61 flexed. In the flexed state, the flanges 60 and 61 exert a spring bias against the panel 75 in one direction and against the nut member 40 in the opposite direction. This bias creates a tight fit against the panel to resist movement of the shank member 8 and nut member 40 relative to the panel 75 due to, for example, vibration of the diaphragm of a piezoelectric transducer mounted in the shank member 8.

Figure 23:
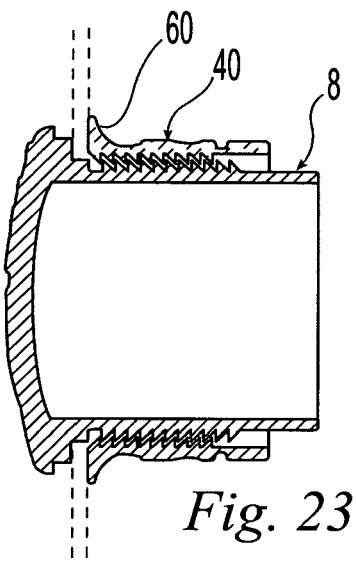
FIG. 23 is a view in section through the lines 23-23 of FIG. 10 illustrating a magnified view of the interlocking teeth of the present invention.

Thus, once initial contact is made between the flanges and the panel, the nut member 40 is displaced still further relative to the shank member 8 to tighten the assembled members that form the housing against the opposing sides of the panel 75. The user forces the nut member 40 preferably one tooth wavelength toward the panel 75 after initial contact, thereby compressing the flanges 60 and 61. The flanges 60 and 61 are compressible a distance equal to at least one tooth wavelength to permit this compression. The device makes a distinctive "click" sound whenever the members have moved another tooth wavelength. Once this compression has occurred and the teeth 50 of the tabs 46 and 48 have passed over the teeth 26 of the shank member 8 and been displaced radially into the gaps between the teeth 26, the nut member can be released and the entire combination of the shank member 8 and nut member 40 is locked in place by the spring force of the flanges 60 and 61 against the panel forcing the nut member's teeth's trailing wall 50*t* to seat against the shank member's trailing wall 26*t* as shown in FIG. 23. The radially inwardly directed force of the tabs 46 and 48 keeps the teeth 50 in the gaps between the teeth 26. The resiliently flexed flanges 60 and 61 seated against one side of the panel 75 apply a bias to the nut member 40 and the panel 75 interposed between the nut member 40 and the head 10, thereby preventing any significant lateral or longitudinal movement of the assembled fastener relative to the panel 75.

If it is desired to remove the nut member 40 from the shank member 8, the operator can grasp the head 10 with one hand and the nut member 40 with the other hand and rotate the parts relative to one another a partial turn, such as, for example, between about 20 and about 90 degrees. Gripping of the nut member 40 is enhanced by the gripping protrusions 49, which extend radially outwardly from the outer surface of the nut member 40. The relative rotation will cause the teeth 50 to come out of registration with the teeth 26 in the channels 24 and 25 and ride up onto the smooth regions 21 and 23 as shown in FIG. 31. The nut member 40 can then be pulled longitudinally off of the sidewall 20 of the shank member 8 due to the small frictional resistance to longitudinal movement of the nut member 40 that the smooth regions 21 and 23 provide to the teeth 50, thereby separating the two parts of the housing; the nut member 40 and the shank member 8.

The nut member 40 is easily removed from the shank member 8 by the rotation that causes the alignment of the teeth 50 with the smooth regions 21 and 23. The smooth regions 21 and 23 on the outer surface of the shank member are preferably positioned in pairs on opposite sides of the shank member 8, just as the tabs 46 and 48 are positioned on opposite sides of the nut member 40. The channels 24 and 25 are about one-third as wide as the smooth regions, but this relationship could be modified. Because the teeth 26 do not extend entirely around the circumference of the shank member's 8 sidewall 20, but are separated from one another by the smooth regions 21 and 23, the nut member 40 can be removed by simply positioning the tabs 46 and 48 over the smooth regions 21 and 23, because the smooth regions 22 do not significantly resist the longitudinal sliding movement of the nut member 40 relative to the shank member 8. This lack of resistance is due to the absence of any surface structures on the smooth regions 21 and 23 that would tend to engage, or be engaged by, the teeth 50.

It is preferred that the deepest points of the gaps between the teeth 26, which are the points to which the tips of the teeth 50 plunge upon passing over the tips of the teeth 26, be positioned radially inwardly of the smooth regions 21 and 23 and preferably at substantially the same radial position as the channel floors 24 and 25. This relative positioning prevents unintended rotation of the nut member 40 relative to the shank member 8. During deliberate rotation of the nut member 40 relative to the shank member 8, the tips of the teeth 50 have to be displaced radially outwardly from the deepest parts of the gaps between the teeth 26 to the smooth regions 21 and 23. The inclined channel walls 24w and 25w make it easy for the ends of the teeth 50 on the tabs 46 and 48 to slide circumferentially onto the smooth regions 21 and 23 from their more radially inward position in the channels. Without the inclination of the walls 24w and 25w, the ends of the pawl teeth 50 would abut the sides of the channels 24 and 25, making rotation for removal more difficult, and therefore this is not the preferred configuration. Of course, the walls 24w and 25w could lack the inclined surfaces so long as the ends of the teeth 50 have inclined ends as will become apparent to a person of ordinary skill. However, in the preferred embodiment both the channel walls and the ends of the teeth 50 are inclined.

The preferred embodiment of the invention is a fastener or housing that permits the nut member 40 to be positioned on the shank member 8 with one continuous movement that is longitudinal toward opposing sides of a panel or other structure through which an aperture is formed. The members seat firmly on opposite sides of the panel or other structure once fastened due to the springs that engage at least one of the panel sides, and due to the nut member 40 having discrete stops at the registration of each pawl between two adjacent teeth. Removal of the nut member 40 is easily accomplished without damage to the housing or fastener by rotating the nut member 40 relative to the shank member 8 part of a turn and pulling the two parts longitudinally away from one another. No tools are needed, and no complete rotation of one member relative to the other is required for fastening or for removal.

Figure 14:
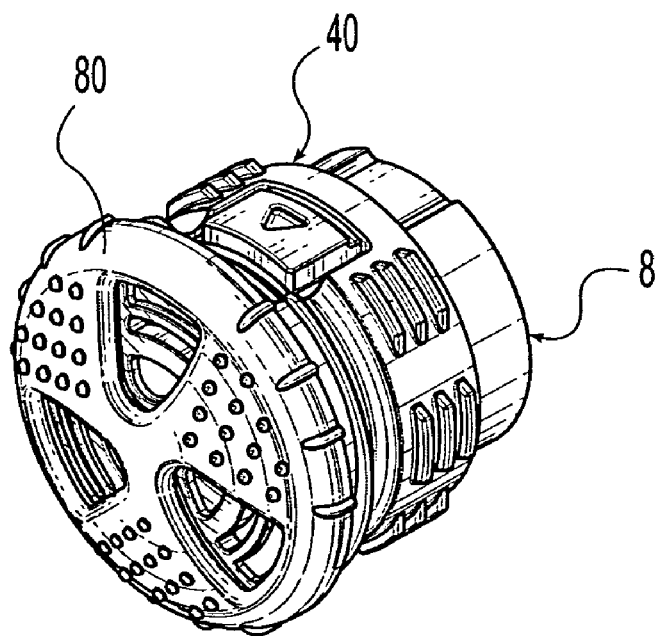
FIG. 14 is a view in perspective illustrating the preferred embodiment of the present invention with the cap in an operable position.
Figures 28, 32, 33:
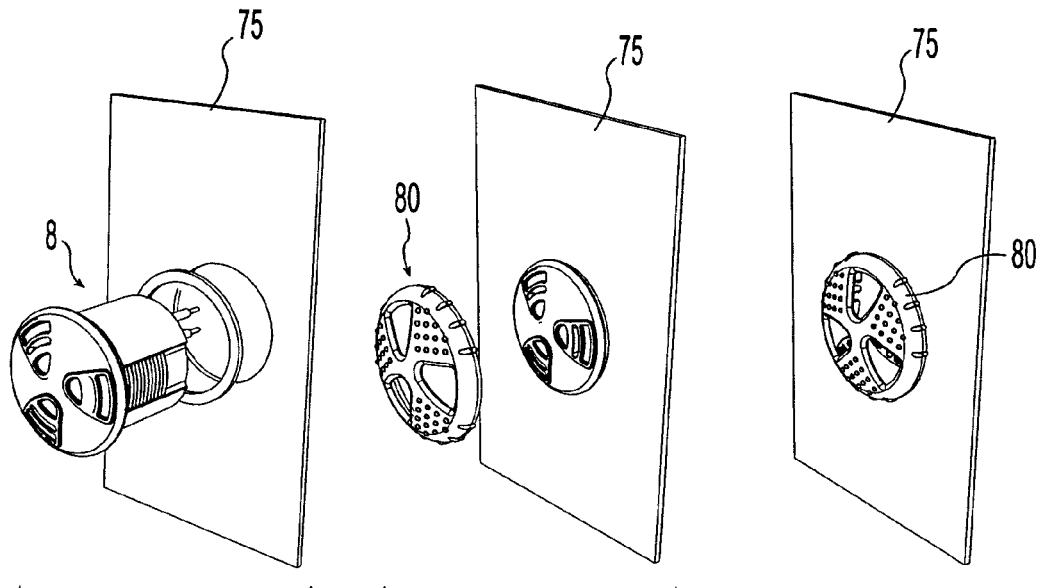
FIG. 28 is a view in perspective illustrating the shank member being inserted into an aperture in a panel.
FIG. 32 is a view in perspective illustrating the cap being mounted on the head.
FIG. 33 is a view in perspective illustrating the cap mounted on the head and slightly offset to restrict the movement of sound through the head.
Figures 29, 30, 31:
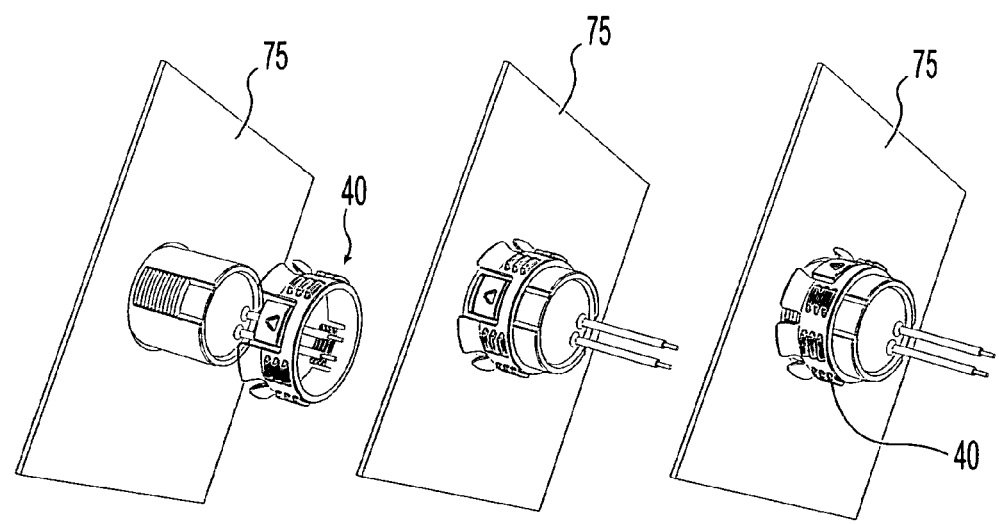
FIG. 29 is a view in perspective illustrating the nut member being aligned coaxially with the shank member.
FIG. 30 is a view in perspective illustrating the nut member positioned on the shank member.
FIG. 31 is a view in perspective illustrating the nut member in a state of being removed from the shank member.
Figure 34:
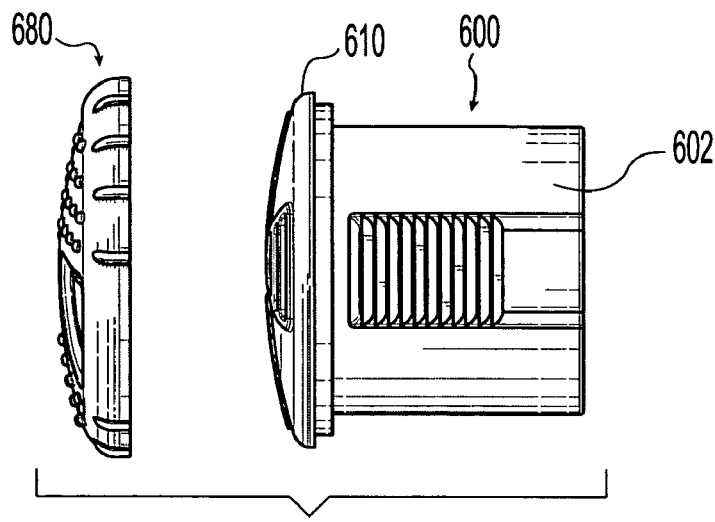
FIG. 34 is a side view illustrating the preferred cap adjacent the preferred housing body.
Figure 36:
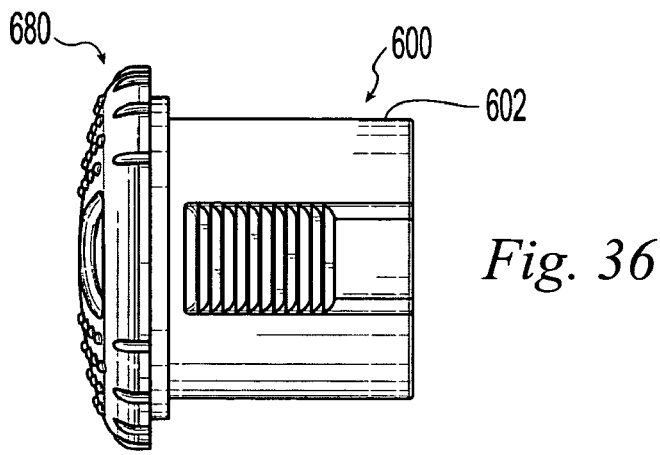
FIG. 36 is a side view illustrating the cap mounted to the housing.
Figure 35:
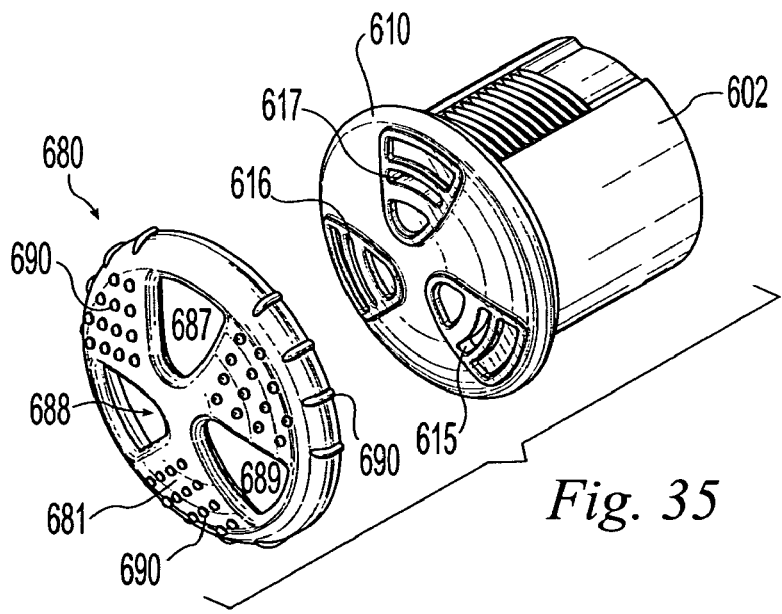
FIG. 35 is an exploded view in perspective illustrating the cap adjacent the housing.

The cap 80 is a shutter that is preferably rotatably mounted to the head 10 as shown in FIGS. 10, 14 and, just prior to mounting, in FIGS. 27 and 32. Although it is preferred to do so, the cap 80 need not be used with the nut and shank members described above. It could be used with different panel-mounting structures.

The cap 80, shown in FIGS. 15, 16 and 17, preferably has three teeth 82, 84 and 86 that extend radially inwardly from an outer cap wall. The teeth extend beneath the lip 13 of the head 10 when the cap 80 is positioned on the head 10 as shown in FIG. 14. The cap has apertures 87, 88 and 89 that can register with the openings 15, 16 and 17 in the head 10, as shown in FIG. 14, to permit sound waves to travel from the chamber in the shank member 8. The cap 80 can be rotated to position the apertures 87-89 in one of many offset positions, one of which is shown in FIG. 33, to partially or completely block openings 15-17 to affect the transmission of sound waves through the openings 15-17.

Figure 37:
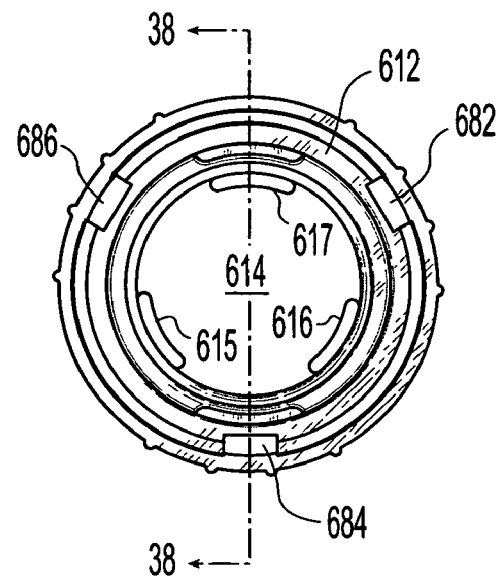
FIG. 37 is an end view illustrating the cap mounted to the housing.
Figure 38:
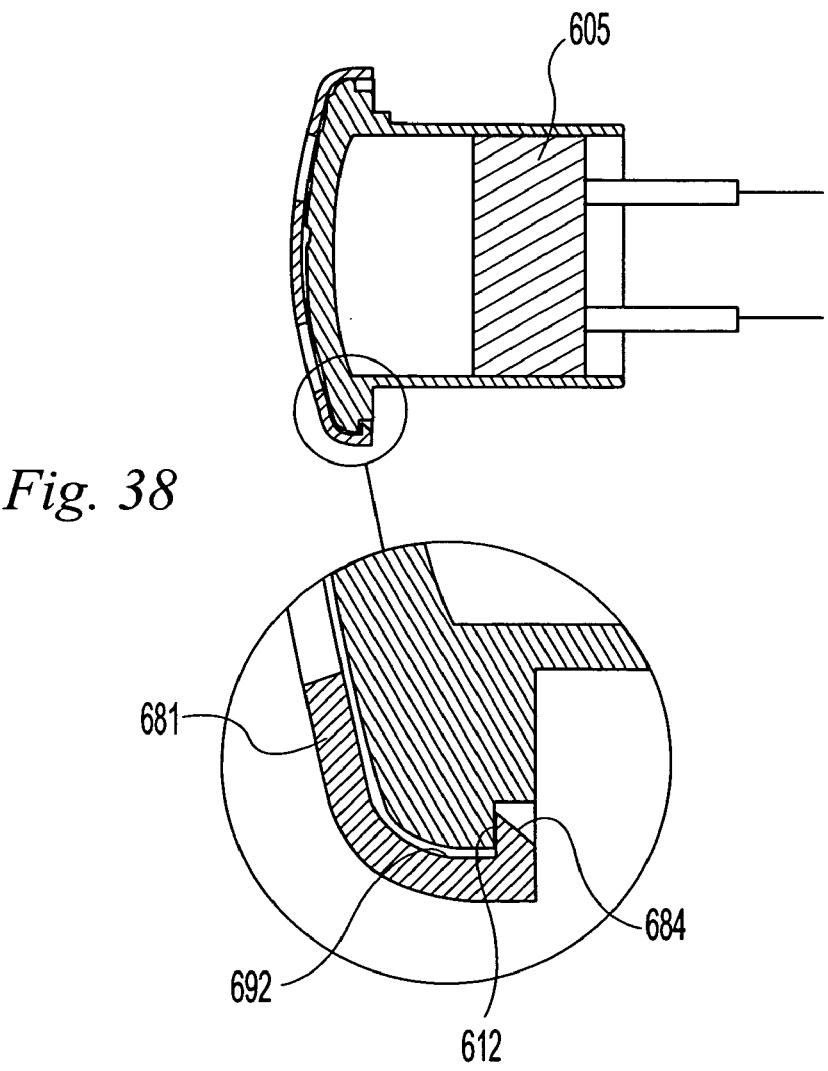
FIG. 38 is a side view illustrating the embodiment of FIG. 37 in section through the line 38-38, and includes a magnified view of the encircled portion of FIG. 38.
Figure 39:
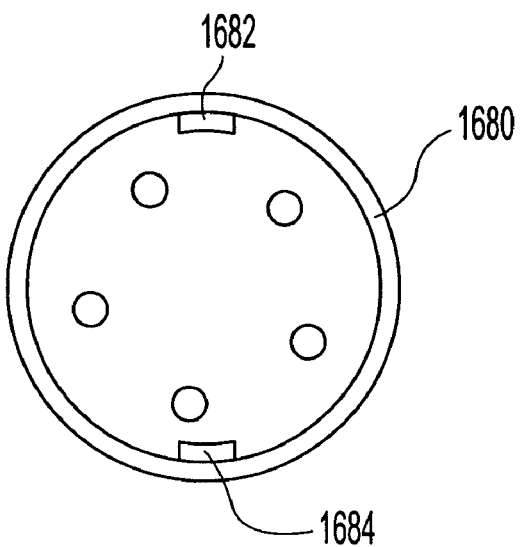
FIG. 39 is an end view illustrating an alternative embodiment of the present invention.
Figure 40:
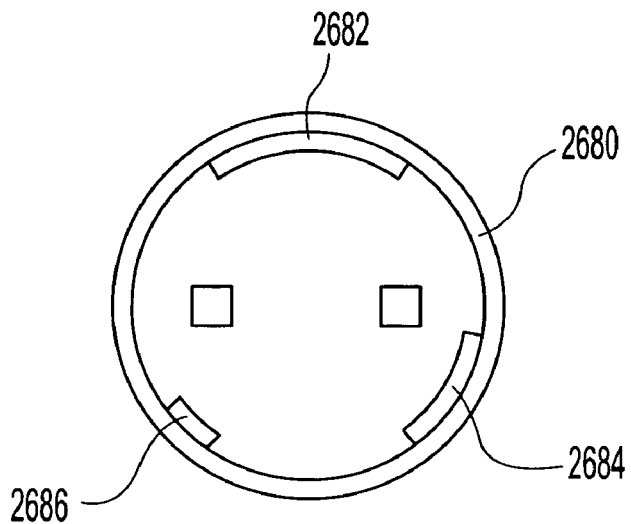
FIG. 40 is an end view illustrating an alternative embodiment of the present invention.
Figure 41:
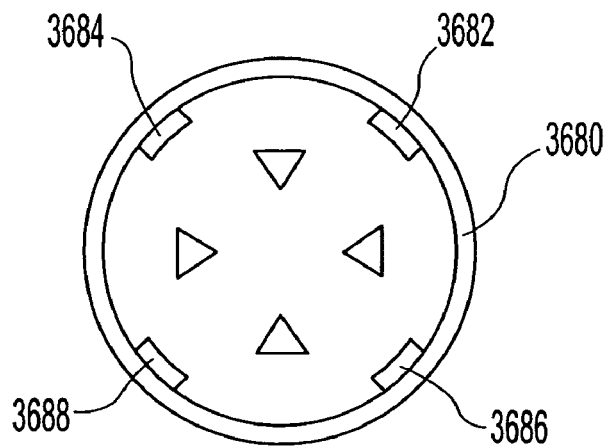
FIG. 41 is an end view illustrating an alternative embodiment of the present invention.

The housing 600 shown in FIGS. 34-38 has a sidewall 602 and an endwall, such as the head 610. A sound-emitting device, such as the piezoelectric alarm 605, is housed in the chamber of the housing 600. The head 610 has three apertures 615, 616 and 617, but could have any number of apertures from one to more than three, extending through the head 610 from the chamber 614 within the housing 600. The apertures are preferably spaced equidistant from one another, such as at every 120 degrees around the circular head 610. The apertures 615-617 are elongated slots, but could be circular, rectangular, triangular (as shown in FIGS. 39, 40 and 41, respectively) or any other suitable shape. The apertures can be varied in size and shape according to aesthetic preference or the wavelength emitted by any sound-emitting device mounted in the chamber 614. Examples of various shapes, sizes and spacings of the apertures are shown in FIGS. 37-50.

The cap 680 is a shutter with a wall 681 that is preferably circular and dome-shaped with a plurality of grippable ribs and bumps 690 on the convex side that forms the outer surface when the cap 680 is in an operable position on the housing 600. There are also three apertures 687, 688 and 689 formed in the cap wall 681 that are preferably spaced equidistant around the circular cap, such as at every 120 degrees, in order to be able to be aligned with the apertures 615-617 in the head 610. The cap 680 mounts to the head 610 so as to be rotatable around the axis of the sidewall 602. Any shape or size cap that rotates relative to the head can be substituted for the cap 680, as will become apparent to the person of ordinary skill.

The cap 680 mounts to the head 610 by cooperating structures that permit its relative rotation. The preferred such structures include the teeth 682, 684 and 686 that extend radially inwardly from the cap wall 681 to form a groove 692 between the teeth and the cap wall 681, as shown in FIGS. 37 and 38. The groove 692 is circular in order to allow rotation of adjacent cooperating structures. Of course, it is possible that only particular regions of the groove 692 could be circular, because rotation could occur only through a limited range, related to the size of the regions and aperture dimensions.

A shoulder, such as the lip 612, is formed at the circular outer peripheral edge of the head 610, and extends radially outwardly from the head into the groove 692. By inserting the circular lip 612 into the circular groove 692, the cap 680 is mounted to the head 610 in such a way as to permit relative rotation between the two components. By providing a moderately tight fit of the lip 612 between the cap wall 681 and the teeth 682, 684 and 686, the cap 680 can be rotated relative to the head 610 by simply gripping it with the hand or a hand tool, and moving it. Furthermore, the frictional resistance to movement is sufficient to prevent unintentional impacts or vibration from rotating the cap. As noted above, it is possible to make only portions of the cooperating structures circular, which would thereby limit the degree of rotation of the cap to the housing. Thus, the lip could be circular in only particular regions matching those of the groove. However, preferably the lip 612 is circular around the entire periphery.

In the preferred embodiment, the cap 680 is mounted on the head 610 by placing one of the teeth around the lip 612, and then pressing the cap 680 toward the head 610, thereby deforming the cap 680. The cap has enough elasticity to permit this deformation, and then return to its original shape upon removal of the deforming force. The deformation causes the remaining two teeth to be displaced radially outwardly on the head 610. When the tips of the remaining teeth reach the extremity of the lip 612, the cap snaps the teeth radially inwardly around the lip 612 to place the lip in the groove 692. Removal can be effected by prying the cap off of the head 610.

Although three teeth of the same size are shown on the cap 680, the person of ordinary skill will recognize that other numbers, spacings and sizes of teeth will suffice for the present invention. For example, the cap 1680 shown in FIG. 39 has two teeth 1682 and 1684 on opposite sides of the cap. The cap 2680 shown in FIG. 40 has three teeth 2682, 2684 and 2686, each of which is a different size. The cap 3680 has four teeth 3682, 3684, 3686 and 3688 spaced around the cap.

Figure 42:
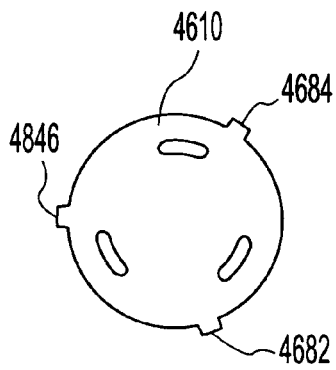
FIG. 42 is an end view illustrating an alternative housing.
Figure 43:
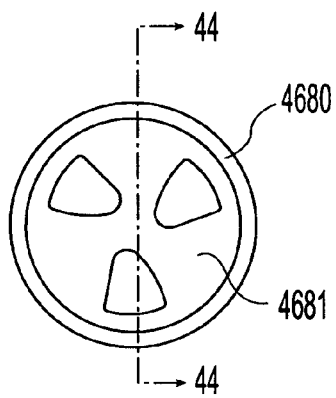
FIG. 43 is an end view illustrating an alternative cap.
Figure 44:
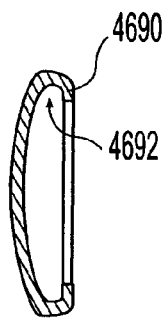
FIG. 44 is a side view illustrating the embodiment of FIG. 43 in section through the line 44-44.

Additionally, although the lip 612 of the head 610 is inserted within the groove 692 formed on the cap 680, it is possible to form the teeth 4682, 4684 and 4686 on the head 4610 that extend into a groove 4692 on the cap 4680 as shown in FIGS. 42, 43 and 44. The cap 4680 has a groove formed around the periphery between the endwall 4681 and the rim 4690, and the teeth 4682, 4684 and 4686 extend into the groove.

Figure 45:
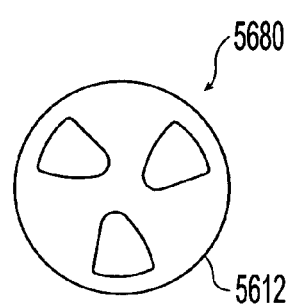
FIG. 45 is an end view illustrating an alternative cap.
Figure 46:
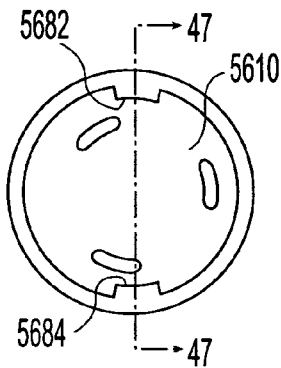
FIG. 46 is an end view illustrating an alternative housing.
Figure 47:
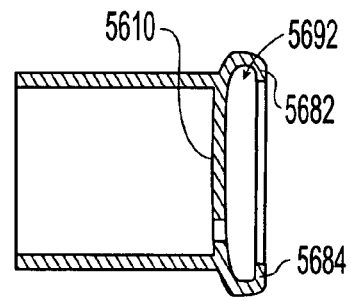
FIG. 47 is a side view illustrating the embodiment of FIG. 46 in section through the line 47-47.
Figure 48:
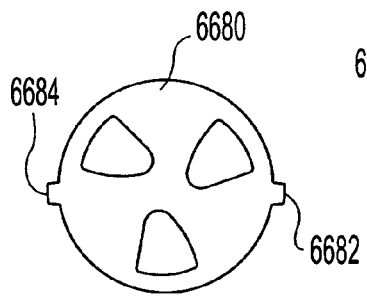
FIG. 48 is an end view illustrating an alternative cap.
Figure 49:
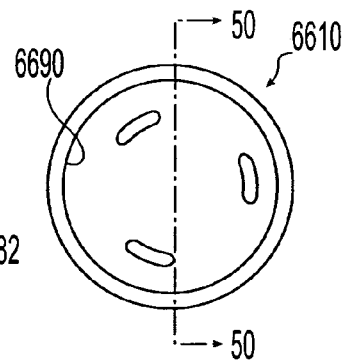
FIG. 49 is an end view illustrating an alternative housing.
Figure 50:
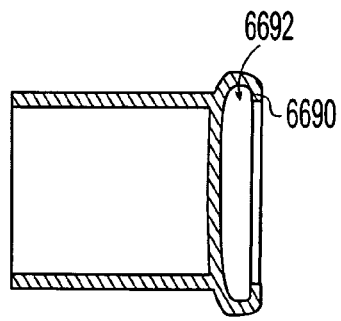
FIG. 50 is a side view illustrating the embodiment of FIG. 49 in section through the line 49-49.

Still further, the two engaging structures can be reversed so that the groove 5692 is formed on the head 5610 between the teeth 5682 and 5684 and the endwall 5610, as shown in FIGS. 45, 46 and 47. The lip 5612 is formed on the cap 5680. In another alternative embodiment, the teeth 6682 and 6684 are formed on the cap 6680, as shown in FIGS. 48-50. The housing 6610 has a rim 6690 that extends entirely around the periphery of the housing 6610, forming a groove 6692 into which the cap's teeth are inserted.

Figure 19:
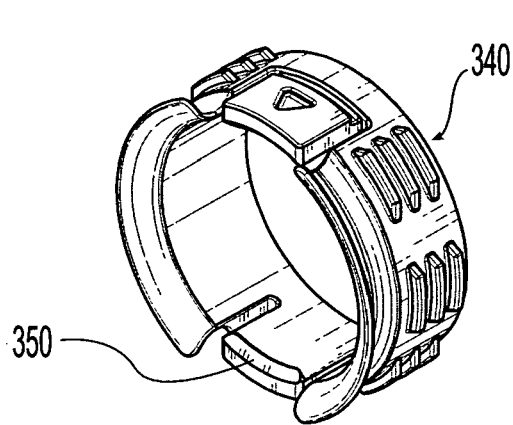
FIG. 19 is a view in perspective illustrating an alternative embodiment of the nut member.

It will become apparent from the description herein that there are various alternative structures that can accomplish the purpose of the preferred embodiment in attaching the nut member to the shank member. For example, in the preferred embodiment, the pawl is actually a plurality of pawls formed by the teeth 50. Of course, it would be possible to limit the pawl to just one tooth 350, as in the nut member 340 shown in FIG. 19. The single tooth 350 cooperates with the teeth 26 of the shank member 8 to lock the nut member 340 in place on the shank member 8.

Figure 5:
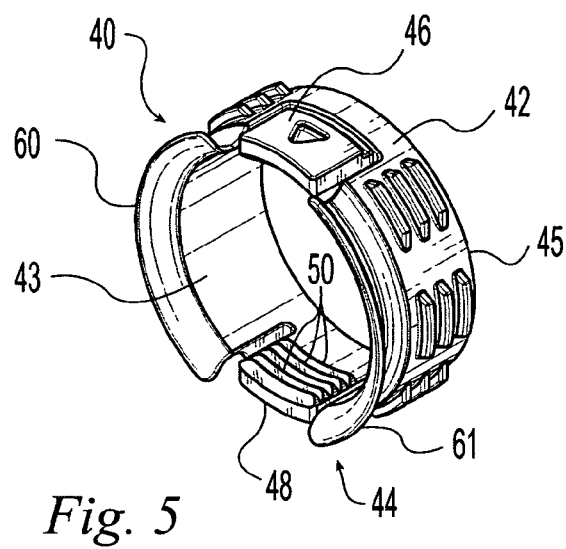
FIG. 5 is a view in perspective illustrating the nut member.
Figures 6, 7:
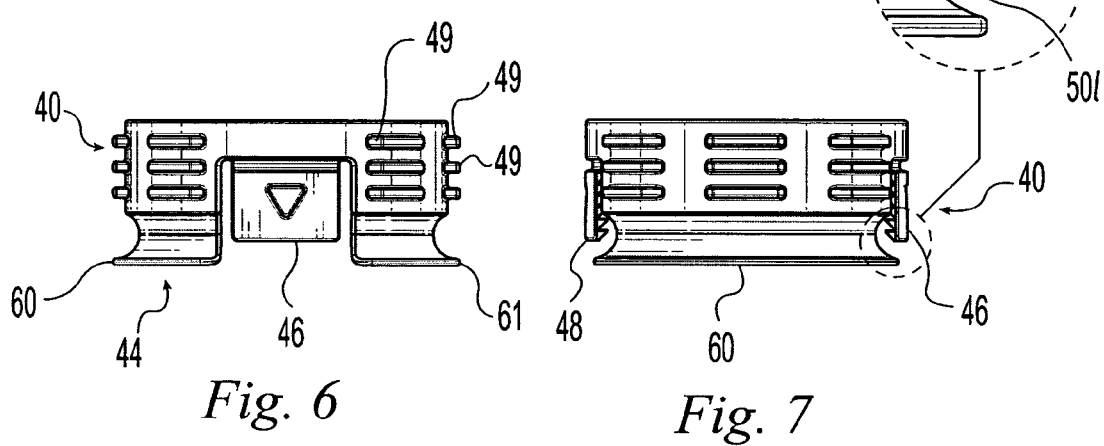
FIG. 6 is a plan view illustrating the nut member.
FIG. 7 is a side view illustrating the nut member.
Figure 8:
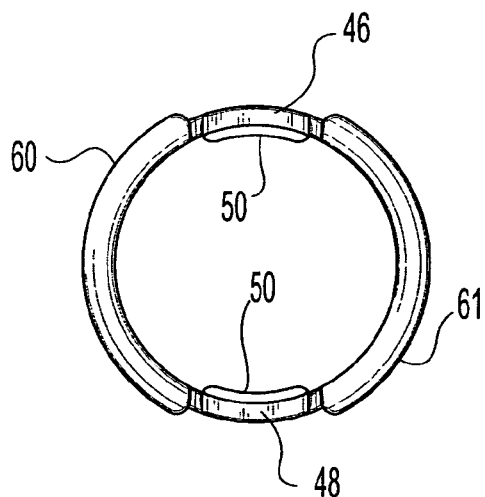
FIG. 8 is an end view illustrating the nut member.
Figure 9:
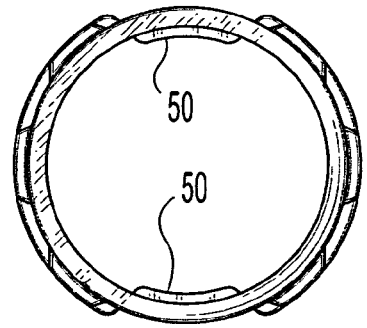
FIG. 9 is an end view, opposite the view of FIG. 8, illustrating the nut member.
Figure 20:
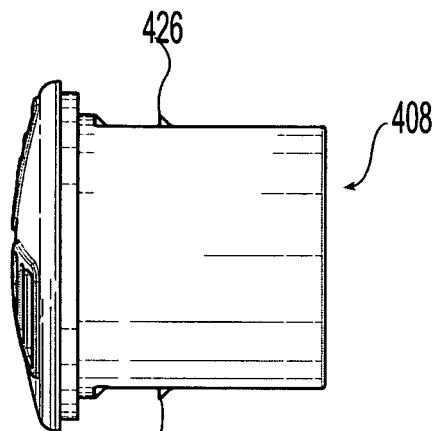
FIG. 20 is a side view illustrating an alternative embodiment of the shank member.
Figure 21:
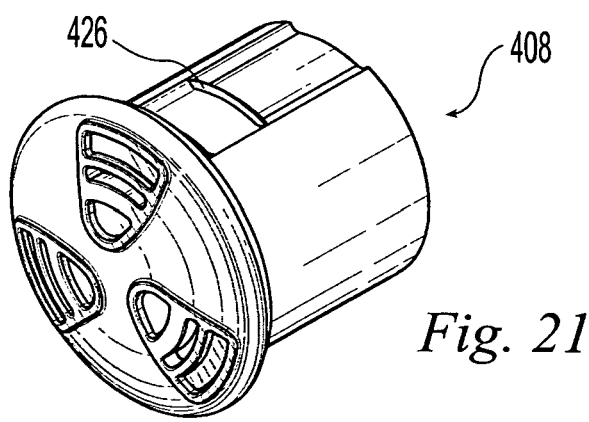
FIG. 21 is a view in perspective illustrating the alternative embodiment of the shank member of FIG. 20.

In a different alternative embodiment, instead of the preferred plurality of teeth 26 on the shank member 8 as shown in FIGS. 1 and 5, the shank member 408 could have a single tooth 426, which forms a pawl, as shown in FIGS. 20 and 21. The teeth 50 on the tabs 46 and 48 of the nut member 40 can then cooperate with the tooth 426 on the shank member 408 to lock the nut member 40 in place on the shank member 408. In this embodiment, the pawl is on the shank member 408 and the plurality of teeth 50 are formed on the nut member 40. It is apparent that the pawl can be on the shank member or the nut member, and the plurality of teeth can be on the other of the two members. It is also contemplated that the pawl, if mounted on the shank member, can be radially displaceable. Such combinations and permutations of the number and placement of the pawl and plurality of teeth elements of the invention will become apparent to a person of ordinary skill from the preferred and alternative embodiments described and shown herein.

Figure 11:
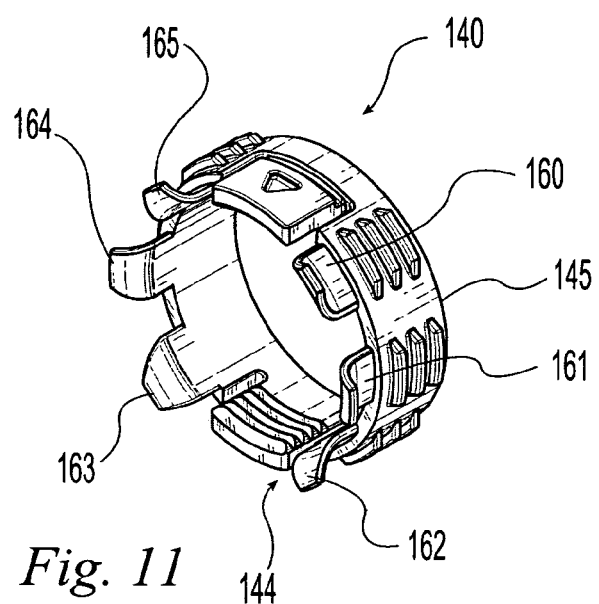
FIG. 11 is a view in perspective illustrating an alternative embodiment of the nut member.
Figure 12:
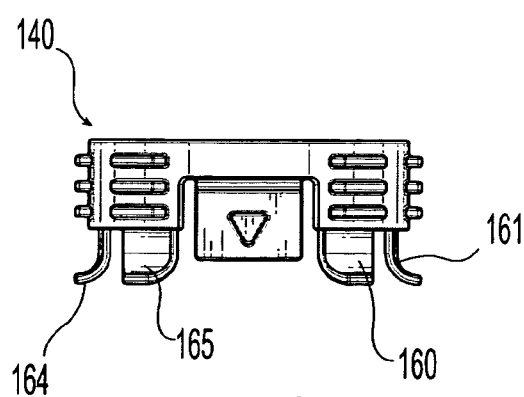
FIG. 12 is a side view illustrating the alternative nut member of FIG. 11.
Figure 13:
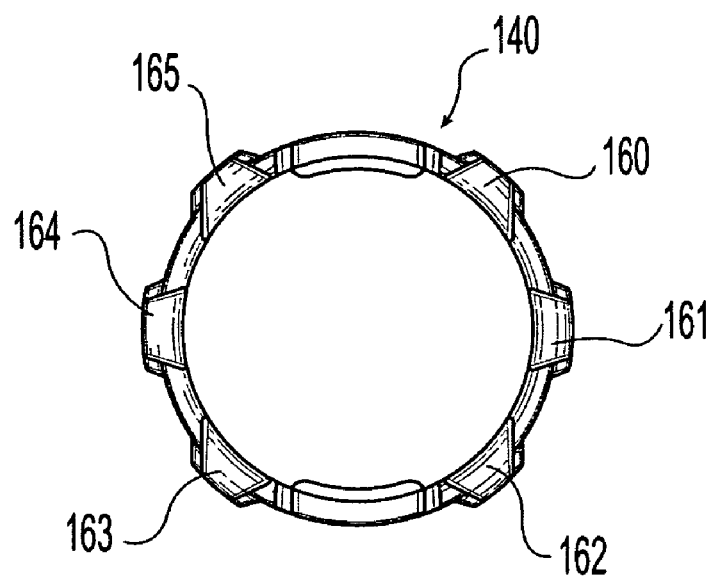
FIG. 13 is a plan view illustrating the alternative nut member of FIG. 11.

Another alternative nut member 140 is shown in FIGS. 11, 12 and 13. The nut member 140 has an annular, circular cylindrical configuration with a first end 144 and a second end 145. The configuration of the nut member 140 is virtually identical to the nut member 40, with one substantial exception. Rather than the spring being formed by the pair of flanges 60 and 61 on the nut member 40, the nut member 140 has a plurality of fingers 160, 161, 162, 163, 164 and 165. The fingers 160-165 extend longitudinally from the end 144 in much the same manner as the flanges 60 and 61 to form springs that can engage a panel or other structure to which the invention is attached. Thus, the fingers 160-165 perform essentially the same spring function as the flanges 60 and 61.

Another alternative nut member 240 is shown in FIG. 18. The nut member 240 has an annular, circular cylindrical configuration with a first end 244 and a second end 245. The configuration of the nut member 240 is virtually identical to the nut member 40, with one substantial exception. Rather than the pair of flanges 60 and 61 formed on the nut member 40, the nut member 240 has a plurality of smaller fingers 260-267. The fingers 260-267 extend longitudinally from the end of the nut member 244 to form springs that can seat against a panel or other structure to which the invention is attached to. Thus, the fingers 260-267 perform essentially the same function as the flanges 60 and 61.

Figure 22:
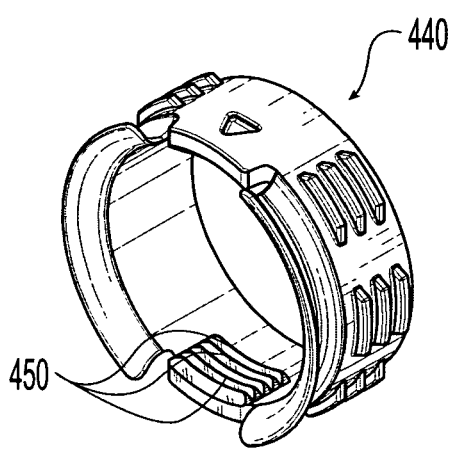
FIG. 22 is a view in perspective illustrating an alternative embodiment of the nut member.

Another alternative nut member 440 is shown in FIG. 22, in which a plurality of teeth 450 are formed on the radially inwardly facing surface of the annular nut member 440. The nut member 440 does not have tabs as in the preferred embodiment. Instead of tabs that are displaced radially outwardly, the entire nut member 440 is deformed to permit the teeth 450 to slide over the teeth 26 formed on the shank member 8. Each tooth 450 forms a pawl that cooperates with the teeth 26 as described above for the preferred embodiment, but due to deformation of the nut member 440 rather than the bending of tabs only.

Figure 24:
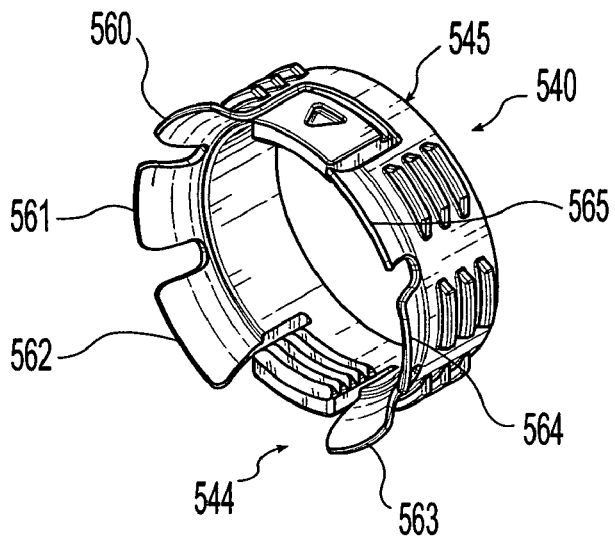
FIG. 24 is a view in perspective illustrating an alternative embodiment of the nut member.
Figure 25:
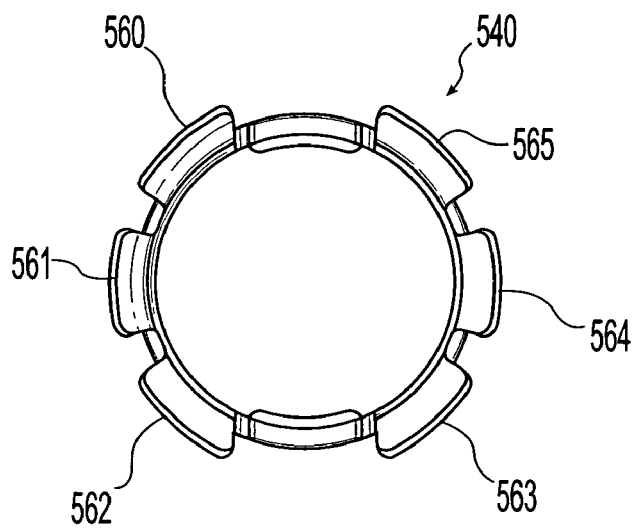
FIG. 25 is a top view illustrating the nut member of FIG. 24.
Figure 26:
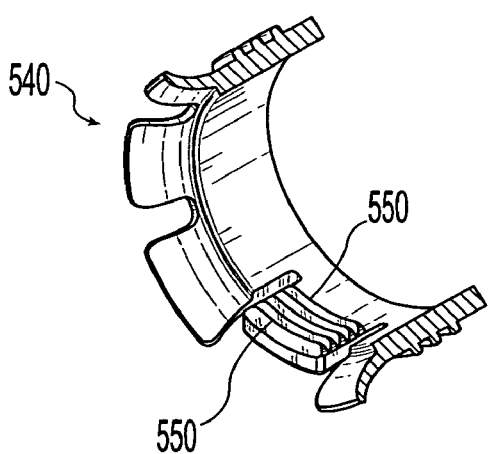
FIG. 26 is a view in section illustrating the nut member of FIG. 24.

Another alternative nut member 540 is shown in FIG. 24. The nut member 540 has an annular, circular cylindrical configuration with a first end 544 and a second end 545. The configuration of the nut member 540 is virtually identical to the nut member 40, with one substantial exception. Rather than the pair of flanges 60 and 61 formed on the nut member 40, the nut member 540 has a plurality of smaller flexible leaves 560-565. The leaves 560-565 extend longitudinally to form springs that can seat against a panel or other structure to which the invention is attached to. Thus, the leaves 560-565 perform essentially the same function as the flanges 60 and 61.

As described above, the protruding springs are an important element of the invention. A "spring" is a device which stores mechanical, potential energy as a function of its distortion, displacement, deflection or rotation (collectively referred to as displacement or deflection). A spring stores energy when it is displaced and returns energy when it returns to its non-displaced condition. The spring applies a force which is a function of its displacement. The relationship between spring force and spring displacement is the spring force coefficient, which, when the relationship is linear, is known as the spring constant.

One type of spring is the mechanical spring, which is displaced resiliently or elastically by mechanical deformation. These include coil springs, torsion bar springs, planar springs and other elastic bodies, such as an elastic cord, washer, block or ribbon. Another type of spring is the gas spring, in which a fluid, typically a gas, is confined to a variable volume container, such as an enclosed cylinder with a piston. A cantilever spring is a body, typically a beam, which is anchored to another body at an end and can bend in a resilient, elastic manner. The beam may be linear, curved, or include bends. Thus, a spring may be formed with any body that can flex, bend, expand, compress, or otherwise be deformed in a resiliently elastic manner. Springs can apply their force in a direction along a line or as a torque.

Another example of a spring is a magnetic spring. A magnetic spring can be formed either by placing two magnets in close proximity or by placing a magnet and a ferromagnetic material in close proximity. When placing two springs in close proximity, either the similar poles can face one another, or the dissimilar poles can face one another. One example of a magnetic spring used in the present invention is a magnet mounted to an end of the nut member with its north pole facing the panel and another magnet on the head of the shank member with its north pole facing the panel. The repulsive forces of the magnets would serve as a spring to bias the nut member and head of the shank member to avoid a loose fit with the panel. Alternatively, one could have magnets with dissimilar poles facing the interposed panel, thereby creating a bias by the magnets' attraction to one another. Alternatively, one could use a magnet on the nut member or shank member only, if the panel is made of a ferromagnetic material.

The preferred spring for the invention is a mechanical spring, which is attached to the nut member as described above. Alternatively, the spring could be attached to the head of the shank member. This would position the spring on the side of the panel or other structure opposite to the nut member. There would still be a spring applying a bias to the panel and one of the nut or shank members in this alternative embodiment. Still further, although it is preferred for the spring to be attached to one of the members, the spring could be a separate body that is interposed between the nut and the head with the panel or other structure. An example of such a spring is an elastomeric washer that fits over the shank member and is interposed between the panel and the nut member. Such a spring engages the panel member at one side and the nut member at the opposite side. Of course, such a spring could alternatively be interposed between the head and the panel.

While certain preferred embodiments of the present invention have been disclosed in detail, it is to be understood that various modifications may be adopted without departing from the spirit of the invention or scope of the following claims.

The invention claimed is:

1. A panel-mountable, sound-emitting apparatus comprising:

(a) a housing body having a sidewall and an endwall forming a chamber housing sound-emitting means, the housing body having a substantially circular peripheral shoulder;
(b) at least one housing aperture formed in the endwall through which sound waves can travel from the chamber;
(c) a cap body rotatably mounted to said housing body at the substantially circular peripheral shoulder, said cap body having a cap wall with at least one cap aperture configured to register at least partially with said at least one housing aperture;
(d) a lip formed by a peripheral edge of the cap body; and
(e) a groove on the housing body defined by the endwall at one lateral groove side and at least one tooth extending from the housing body on an opposite lateral groove side for retaining the lip of the cap body in the groove.

2. A panel-mountable, sound-emitting apparatus comprising:

(a) a housing body having a sidewall and an endwall forming a chamber housing sound-emitting means, the housing body having a substantially circular peripheral shoulder;
(b) at least one housing aperture formed in the endwall through which sound waves can travel from the chamber;
(c) a cap body rotatably mounted to said housing body at the substantially circular peripheral shoulder, said cap body having a cap wall with at least one cap aperture configured to register at least partially with said at least one housing aperture;
(d) at least one tooth formed by a peripheral edge of the cap body; and
(e) a groove is formed on the housing body and is defined by the endwall at one lateral groove side and a rim extending from the housing body on an opposite lateral groove side, said groove retaining said at least one tooth.

3. The apparatus in accordance with claim 2, wherein said at least one tooth further comprises a plurality of teeth spaced around the peripheral edge of the cap body and inserted into the groove.

4. A panel-mountable, sound-emitting apparatus comprising:

(a) a housing body having a sidewall and an endwall forming a chamber housing sound-emitting means, the housing body having a substantially circular peripheral shoulder;
(b) at least one housing aperture formed in the endwall through which sound waves can travel from the chamber;
(c) a cap body rotatably mounted to said housing body at the substantially circular peripheral shoulder, said cap body having a cap wall with at least one cap aperture configured to register at least partially with said at least one housing aperture;
(d) at least one tooth formed on a peripheral edge of the housing body; and
(e) a groove is defined by the cap wall at one lateral groove side and a rim extending from the cap body on an opposite lateral groove side, said groove retaining said at least one tooth formed on the peripheral edge of the housing body.

5. The apparatus in accordance with claim 4, wherein said at least one tooth further comprises a plurality of teeth spaced around the peripheral edge of the housing body and inserted into the groove.

6. A panel-mountable, sound-emitting apparatus comprising:
 (a) a housing body having a substantially cylindrical sidewall and an endwall at a first sidewall end forming a chamber housing a sound-emitting device, the housing body also having a substantially circular peripheral shoulder;
 (b) at least one aperture formed in the endwall through which sound waves can travel from the chamber;
 (c) a cap body rotatably mounted to said endwall at the substantially circular peripheral shoulder, said cap body having a cap wall with at least one aperture that is configured to register at least partially with said at least one aperture in the endwall; and
 (d) a plurality of teeth formed on the cap body and spaced around the cap body defining a groove between the teeth and the cap wall into which the substantially circular peripheral shoulder extends, said teeth extending around the shoulder at opposing sides of the endwall.

7. The apparatus in accordance with claim 6, wherein said plurality of teeth are spaced equidistant around the cap body.

8. The apparatus in accordance with claim 7, wherein said at least one cap aperture further comprises a plurality of cap apertures spaced equidistant around the cap wall.

9. The apparatus in accordance with claim 8, wherein said at least one endwall aperture further comprises a plurality of endwall apertures spaced equidistant around the endwall in a configuration that permits registration of each of said endwall apertures with one of said cap apertures.

* * * * *